United States Patent
Wan et al.

(10) Patent No.: US 10,472,257 B2
(45) Date of Patent: Nov. 12, 2019

(54) EFFICIENT AND ENERGY-SAVING WASTEWATER EVAPORATION CRYSTALLIZER

(71) Applicant: Sheng Fa Environmental Protection Technology (Xiamen) Co., Ltd., Xiamen (CN)

(72) Inventors: Zhongcheng Wan, Xiamen (CN); Jingrui Zhang, Xiamen (CN); Mingjun Ma, Xiamen (CN)

(73) Assignee: SHENG FA ENVIRONMENTAL PROTECTION TECHNOLOGY (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 16/284,345

(22) Filed: Feb. 25, 2019

(65) Prior Publication Data
US 2019/0184307 A1    Jun. 20, 2019

Related U.S. Application Data

(62) Division of application No. 15/474,749, filed on Mar. 30, 2017, now Pat. No. 10,258,901.

(30) Foreign Application Priority Data

Apr. 1, 2016  (CN) .......................... 2016 1 0201606

(51) Int. Cl.
*C02F 1/04*    (2006.01)
*C02F 1/12*    (2006.01)
(Continued)

(52) U.S. Cl.
CPC ............ *C02F 1/048* (2013.01); *B01D 9/0027* (2013.01); *C02F 1/12* (2013.01); *B01D 53/501* (2013.01);
(Continued)

(58) Field of Classification Search
CPC .......... C02F 1/048; C02F 1/12; B01D 9/0027
See application file for complete search history.

(56) References Cited

U.S. PATENT DOCUMENTS

2017/0203976 A1*  7/2017  Wu .......................... B01D 1/18

FOREIGN PATENT DOCUMENTS

| CN | 101844819 A | * | 9/2010 | ................ C02F 1/12 |
| CN | 101696041 B | * | 6/2011 | ................ C02F 1/12 |

OTHER PUBLICATIONS

English machine translation of CN 101696041 B, obtained from Google (Year: 2011).*

(Continued)

*Primary Examiner* — Renee Robinson
(74) *Attorney, Agent, or Firm* — Brinks Gilson & Lione

(57) ABSTRACT

The present disclosure relates to a wastewater flue evaporating device. An wastewater evaporation crystallizer is provided, including an evaporating tube inlet, an inlet flange, an inlet chamber, a pneumatic inlet baffle, an evaporating tube body, a pneumatic outlet baffle, an outlet chamber, an outlet flange, and an evaporating tube outlet which are successively coupled, where the evaporating tube inlet is connected to provide a gas pipeline; the gas pipeline is connected on a flue between an external denitration device and an air preheater; the evaporating tube outlet is communicated with an inlet flue of a dust collector; the evaporating tube body is provided with a wastewater nozzle; and the wastewater nozzle is communicated with a pretreated waste pipe. The present disclosure provides an efficient and energy-saving wastewater evaporation crystallizer which increases evaporation efficiency by bringing in a high-temperature gas at a front end of the air preheater.

8 Claims, 1 Drawing Sheet

(51) Int. Cl.
  *B01D 9/00* (2006.01)
  *B01D 53/50* (2006.01)
  *B01D 53/78* (2006.01)
  *C02F 101/10* (2006.01)
  *C02F 101/20* (2006.01)
  *C02F 103/18* (2006.01)

(52) U.S. Cl.
  CPC ...... *B01D 53/78* (2013.01); *B01D 2009/0086* (2013.01); *C02F 2101/10* (2013.01); *C02F 2101/20* (2013.01); *C02F 2103/18* (2013.01)

(56) References Cited

OTHER PUBLICATIONS

English machine translation of CN 101844819 A, obtained from Google (Year: 2010).*

* cited by examiner

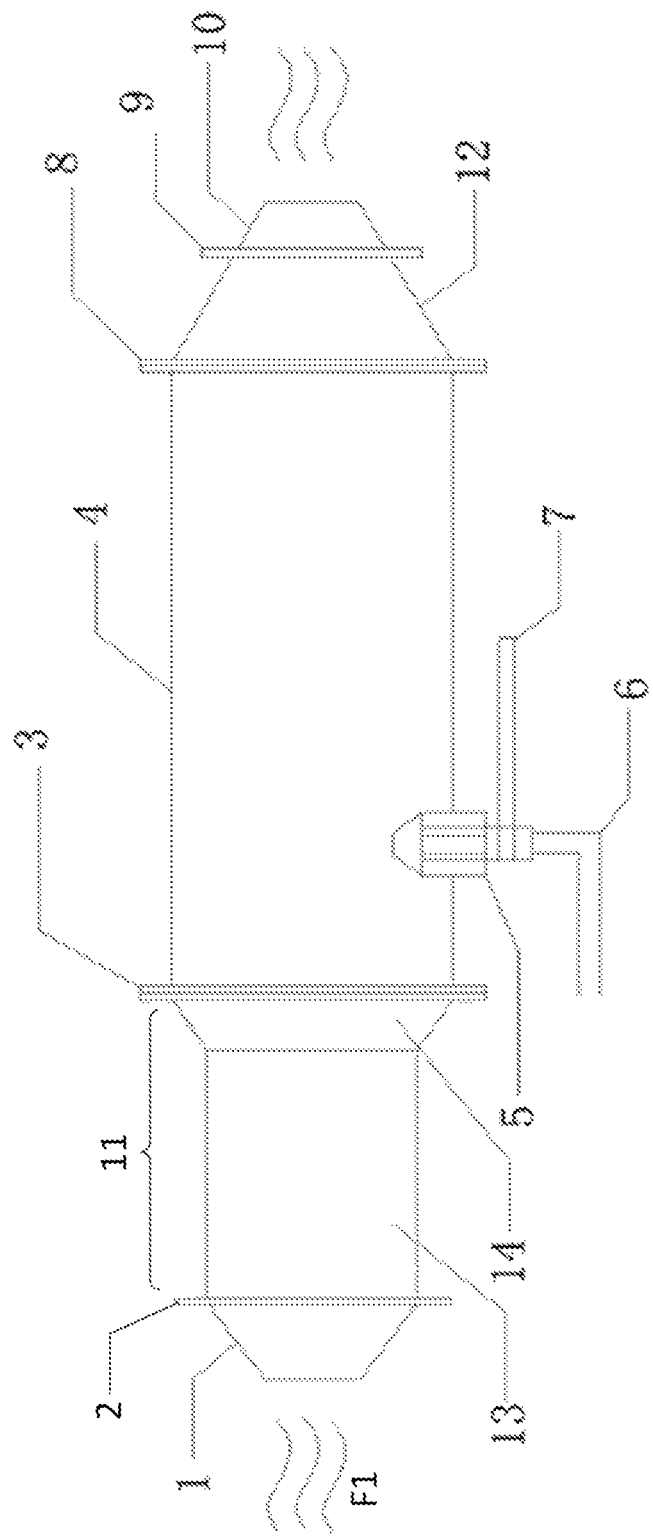

EFFICIENT AND ENERGY-SAVING WASTEWATER EVAPORATION CRYSTALLIZER

CROSS REFERENCE TO RELATED APPLICATIONS

This application is a divisional application of U.S. patent application Ser. No. 15/474,749, filed on Mar. 30, 2017, which claims priority to Chinese patent application No. 201610201606.0 filed on Apr. 1, 2016, all of which are hereby incorporated by reference in their entireties.

TECHNICAL FIELD

The present disclosure relates to a wastewater flue evaporating device, and more specifically to an efficient and energy-saving wastewater evaporation crystallizer which evaporates wastewater by using energy of a high-temperature flue gas at a front end of an air preheater.

BACKGROUND

China is a country mainly based on thermal power generation. Coal combustion in thermal power plants causes severe atmospheric pollution: emission of $SO_2$ of electric systems takes up more than 45% of the national emission of $SO_2$. In order to respond to a call for reducing the mission of $SO_2$ of China, most of the thermal power plants are equipped with a desulfurization system, where a limestone gypsum wet flue gas desulfurization (Limestone Gypsum Wet Flue Gas Desulfurization) technology becomes a first choice of a desulfurization process of the thermal power plants because of advantages such as high desulfurization efficiency, stable operation, a chip absorbent raw material, and recyclable byproduct materials. However, certain desulfurization wastewater is generated when the system operates. Treatment for the desulfurization wastewater becomes critical for accomplishing a zero discharge of wastewater of the thermal power plants because ingredients of the desulfurization wastewater are special, complex, and strongly corrosive.

At present, main methods for treating the desulfurization wastewater are pretreatment (triple-box softening clarification and pipe filtering); condensation and reduction (concentration by evaporation of MED and MVR, membrane concentration MF/RO, UF/RO, UF/NF, UF/RO/ED, UF/RO/FO, and UF/RO/MD); and solidification treatment (natural evaporation and crystallization, an evaporation pond, mechanical atomization and evaporation, and flue atomizing evaporation). The technology of flue atomizing evaporation is predominant in aspects such as an investment cost, a running cost, and a floor surface. However, as an industrial adjustment in China, a load rate of a thermal power plant is low, and a smoke discharging temperature is reduced. When the load is low, a smoke discharging temperature of an air preheater is within 110° C., affecting an evaporation effect of a liquid droplet (the smoke temperature being lower than an acid dew point has a strong corrosivity to a device) and an evaporation capacity. In another aspect, a forced popularization of low-low temperature (GGH) shortens an effective length of a flue which may be used by the flue evaporation, and a narrow space limits a water evaporation quantity; and a complex structure of the flue and an internal support rod add risks of getting dusty, incrusted, and corroded, having great influences on original equipment (such as the flue and a dust collector) of a power plant.

SUMMARY

In order to solve the foregoing technical problem, the present disclosure provides an efficient and energy-saving wastewater evaporation crystallizer. Although a power plant is under a lower operation load, or in a mode that an outlet flue of an air preheater is short and a flue structure is complex, a complete evaporation of desulfurization wastewater of the power plant may also be achieved, thereby ensuring a zero discharge of wastewater of the power plant, and essentially avoiding influences on original equipment of a boiler.

In order to achieve the foregoing objective, the technical solution of the present disclosure provides an efficient and energy-saving wastewater evaporation crystallizer, including an evaporating tube inlet, an inlet flange, an inlet chamber, a pneumatic inlet baffle, an evaporating tube body, a pneumatic outlet baffle, an outlet chamber, an outlet flange, and an evaporating tube outlet which are successively communicated, where the evaporating tube inlet is connected to provide a gas pipeline; the gas pipeline is connected on a flue between an external denitration device and an air preheater; the evaporating tube outlet is communicated with an inlet flue of a dust collector; the evaporating tube body is provided with a wastewater nozzle; and the wastewater nozzle is communicated with a pretreated waste pipe.

Further, the inlet chamber includes a horizontal section and an expansion section; a ratio between cross-sectional areas of the horizontal section and the evaporating tube body is 1:1.3-1:3; one end of the expansion section is connected to the horizontal section; the other end of the expansion section is connected to the evaporating tube body by using the pneumatic inlet baffle; and a sectional dimension of the expansion section gradually increases along a flue gas flow direction.

Further, the pneumatic inlet baffle and the evaporating tube body are detachably connected.

Further, a sectional dimension of the outlet chamber gradually decreases along the flue gas flow direction.

Further, the evaporating tube body and the pneumatic outlet baffle are detachably connected.

Further, the evaporating tube outlet is connected to provide a flue gas pipe; and the flue gas pipe is connected on a flue between the air preheater and the dust collector.

Further, the wastewater nozzle is connected to provide an air compressor air supply pipe; and the air compressor air supply pipe is connected between the wastewater nozzle and the pretreated waste pipe.

Further, the wastewater nozzle is an efficient two-fluid atomizing nozzle; and a particle size of an atomized liquid droplet is 30 μm-100 μm.

By using the foregoing technical solution, the present disclosure provides an efficient and energy-saving wastewater evaporation crystallizer. Heat exchange with fog droplets of the wastewater is reinforced by bringing in a high-temperature airflow, thereby implementing a complete evaporation of the fog droplets of the wastewater while being discharged from the evaporating tube body. Solid particles in the wastewater are collected by the dust collector after being crystallized, and the wastewater is conveyed to an FGD tower along a flue, so as to achieve a zero discharge of wastewater. Compared with the prior art, the present disclosure has the following advantages:

1. The evaporating tube inlet is communicated, through the gas pipeline, with a flue between an external SCR (a denitration device) and the air preheater. A gas is brought in from the front end of the air preheater, so that a temperature of the brought flue gas is generally 330-350° C. An efficiently high flue gas temperature ensures an evaporation efficiency of a liquid droplet.

2. The pneumatic inlet baffle and the pneumatic outlet baffle are provided at an inlet and an outlet of the evaporating tube body, respectively. A flow quantity and a flow rate of the flue gas flowing in and out the evaporating tube body are adjusted by using the pneumatic inlet baffle and the pneumatic outlet baffle. A gas-liquid ratio is adjusted in cooperation with an efficient two-fluid nozzle, so as to control a particle size of an atomized liquid droplet to be 30 μm-100 μm. The atomized liquid droplet can quickly perform a mass transfer and a heat transfer after encountering a high-temperature flue gas, thereby achieving efficient evaporation of the liquid droplet.

3. A ratio between cross-sectional areas of the horizontal section of the inlet chamber and the evaporating tube body is set to be 1:1.3-1:3; and the horizontal section is communicated with the evaporating tube body by using the expansion section of which the sectional dimension gradually increases along the flue gas flow direction. As a result, a time that the flue gas stays in the evaporating tube body can be effectively prolonged, and a rational layout of a reaction space is improved. Therefore, a full contact of the high-temperature air and water mist of the wastewater is achieved, thereby greatly improving the evaporation efficiency.

4. The evaporating tube body is detachably connected to the pneumatic inlet baffle and the pneumatic outlet baffle, separately; this implements a detachable changing and cleaning of the evaporating tube body, and avoids an inner wall of the evaporating tube body getting dusty or incrusted.

5. The present disclosure may be communicated with and detached from a boiler system by using various pipes, and a size may be designed according to actual requirements, having no additional influences on the original equipment of the power plant. Therefore, an investment for the entire device is reduced, and economy for promoting a whole set of devices is enhanced.

BRIEF DESCRIPTION OF THE DRAWINGS

The drawing is a schematic structural diagram of an embodiment of the present disclosure.

DETAILED DESCRIPTION

The present disclosure is further described in combination with the accompanying drawing and the specific implementation manners.

As a specific implementation manner, as shown in the drawing, an efficient and energy-saving wastewater evaporation crystallizer is provided, including an evaporating tube inlet 1, an inlet flange 2, an inlet chamber 11, a pneumatic inlet baffle 3, an evaporating tube body 4, a pneumatic outlet baffle 8, an outlet chamber 12, an outlet flange 9, and an evaporating tube outlet 10 which are successively communicated. Specifically, the evaporating tube inlet 1 is hermetically connected to the inlet chamber 11 through the inlet flange 2; the inlet chamber 11 is connected to the pneumatic inlet baffle 3; the pneumatic inlet baffle 3 is detachably connected to an air-inlet end of the evaporating tube body 4 in a threadably fitting manner; an air-outlet end of the evaporating tube body 4 is detachably connected to pneumatic outlet baffle 8 in a threadably fitting manner; the pneumatic outlet baffle 8 is connected to the outlet chamber 12; and the outlet chamber 12 is hermetically connected to the evaporating tube outlet 10 through the outlet flange 9.

The evaporating tube inlet 1 is communicated with a flue between a denitration device and an air preheater; the evaporating tube outlet 10 is communicated with an inlet flue of the dust collector; the evaporating tube body 4 is provided with a wastewater nozzle 5; and the wastewater nozzle 5 is communicated with a pretreated waste pipe 6.

The inlet chamber 11 includes a horizontal section 13 and an expansion section 14; a ratio between cross-sectional areas of the horizontal section 13 and the evaporating tube body 4 varies between 1:1.2 and 1:1.6; one end of the expansion section 14 is connected to the horizontal section 13; the other end of the expansion section 14 is connected to the evaporating tube body 4 by using the pneumatic inlet baffle; and a sectional dimension of the expansion section 14 gradually increases along a flue gas flow direction. A sectional dimension of the outlet chamber 12 gradually decreases along the flue gas flow direction. The horizontal section 13 is communicated with the evaporating tube body 4 by using the expansion section 14 of which the sectional dimension gradually increases along the flue gas flow direction. As a result, a time that a flue gas stays in the evaporating tube body 4 can be effectively prolonged, and a rational layout of a reaction space is improved. Therefore, a full contact of a high-temperature air and water mist of the wastewater is achieved, thereby greatly improving the evaporation efficiency.

The evaporating tube inlet 1 is connected to a gas pipeline; and the gas pipeline is connected on a flue between an external denitration device and the air preheater. The evaporating tube outlet 10 is connected to a flue gas pipe; and the flue gas pipe is connected on a flue between the air preheater and the dust collector.

The wastewater nozzle 5 is connected to an air compressor air supply pipe 7; and the air compressor air supply pipe 7 is connected between the wastewater nozzle 5 and the pretreated waste pipe 6.

When the efficient and energy-saving wastewater evaporation crystallizer operates, a flue gas F1 from a flue between an SCR (a denitration device) and the air preheater flows into the inlet chamber 11 through the evaporating tube inlet 1. The inlet chamber 11 includes the horizontal section 13 and the expansion section 14, so as to provide a transition section for the flue gas F1. The ratio between cross-sectional areas of the horizontal section 13 and the evaporating tube body 4 may vary between 1:1.3 and 1:3. One end of the expansion section is connected to the horizontal section, and the other end of the expansion section is connected to the evaporating tube body by using the pneumatic inlet baffle. A sectional dimension of the expansion section gradually increases along a flue gas flow direction. The flue gas F1 entering from the inlet chamber 11 may effectively prolong a time that the flue gas stays in the evaporating tube body 4, and improve a rational layout of a reaction space. Therefore, a full contact of a high-temperature air and water mist of the wastewater is achieved, thereby greatly improving the evaporation efficiency. Furthermore, the horizontal section 13 and the expansion section 14 enable, through a transition of the flue gas, the flue gas to be able to be better guided to an internal of the evaporating tube body 4. A flow amount and a flow rate of the flue gas are adjusted in cooperation with the pneumatic inlet baffle 3. The flue gas F1 flows in the inlet chamber 11 from a smaller area to a larger area, and forms a strong airflow in a region of the expansion section 14. A liquid droplet continuously undergoes, in an evaporating tube, a mass transfer and a heat transfer with the high-temperature flue gas, thereby ensuring efficient evaporation of the liquid droplet of the wastewater. Moreover, flushing effects of the mixed flue gas are improved because of the strong airflow. Pretreated desulfurization wastewater is conveyed to an efficient two-fluid atomizing wastewater nozzle 5 through the pretreated waste pipe 6, and by adjusting a gas-liquid ratio, a particle size of the atomized liquid droplet is controlled to vary between 30 μm and 100 μm, optimally to be 50 μm. As a result, the atomized liquid droplet from the nozzle is strongly mixed with the flue gas, so as to make sure that energy of the atomized liquid droplet and the flue gas is fully exchanged and the atomized liquid droplet is completely evaporated in the evaporating tube body 4. As the evaporation of the wastewater, crystals, such as fine particles and heavy metal elements in the wastewater, suspend in the flue gas together with dusts and enter the dust collector through the evaporating tube outlet 10. Particles formed after evaporating and crystallizing the wastewater are collected in the dust collector and are discharged with coal ashes.

By using the foregoing technical solution, this embodiment provides an efficient and energy-saving wastewater evaporation crystallizer. Heat exchange with fog droplets of the wastewater is reinforced by bringing in a high-temperature airflow, thereby achieving a complete evaporation of the fog droplets of the wastewater while being discharged from the evaporating tube body. Solid particles in the wastewater are collected by the dust collector after being crystallized, so as to achieve a zero discharge of wastewater of a power plant. Compared with the prior art, this embodiment has the following advantages:

1. The evaporating tube inlet is communicated, through the gas pipeline, with a flue between an external SCR (a denitration device) and the air preheater. A gas is brought in from a front end of the air preheater, so that a temperature of the brought flue gas is generally 330-350° C. An efficiently high flue gas temperature ensures an evaporation efficiency of the liquid droplet.

2. The pneumatic inlet baffle and the pneumatic outlet baffle are provided at an inlet and an outlet of the evaporating tube body, respectively. A flow quantity and a flow rate of the flue gas flowing in and out the evaporating tube body are adjusted by using the pneumatic inlet baffle and the pneumatic outlet baffle. A gas-liquid ratio is adjusted in cooperation with an efficient two-fluid nozzle, so as to control a particle size of an atomized liquid droplet to be about 50 μm. The atomized liquid droplet can quickly perform a mass transfer and a heat transfer after encountering a high-temperature flue gas, thereby achieving efficient evaporation of the liquid droplet.

3. A ratio between cross-sectional areas of the horizontal section of the inlet chamber and the evaporating tube body is set to be between 1:1.3 and 1:3; and the horizontal section is communicated with the evaporating tube body by using the expansion section of which the sectional dimension gradually increases along the flue gas flow direction. As a result, a time that the flue gas stays in the evaporating tube body can be effectively prolonged, and a rational layout of a reaction space is improved. Therefore, a full contact of the high-temperature air and water mist of the wastewater is achieved, thereby greatly improving the evaporation efficiency.

4. The evaporating tube body is detachably connected to the pneumatic inlet baffle and the pneumatic outlet baffle, separately; this makes it convenient to change or clean the evaporating tube body, so that avoiding an inner wall of the evaporating tube body getting dusty or incrusted.

5. The present disclosure may be communicated with a boiler system by using various pipes, and may also be effectively isolated from the boiler system. A size of the present disclosure may be adjusted according to actual requirements, having no additional effects on the original equipment of the power plant. Therefore, an investment for the entire device is reduced, and economy for promoting a whole set of devices is enhanced.

Although the present disclosure is specifically displayed and introduced in combination with the preferred implementation solutions, a person skilled in the art should understand that various variations may be made to the form and details of the present disclosure without departing from the scope and the spirit of the present disclosure which are defined by the claims, and the variations all fall within the protection scope of the present disclosure.

What is claimed is:

1. A method for evaporating wastewater by a wastewater evaporation crystallizer, wherein the wastewater evaporation crystallizer comprises an evaporating tube inlet, an inlet chamber, an evaporating tube body, an outlet chamber, and an evaporating tube outlet successively coupled, the method comprising:
   obtaining a flue gas through the evaporating tube inlet into the inlet chamber;
   adjusting a pneumatic inlet baffle and a pneumatic outlet baffle to regulate a flow amount and a flow rate of the flue gas, the pneumatic inlet baffle disposed between the inlet chamber and the evaporating tube body, and the pneumatic outlet baffle disposed between the evaporating tube body and the outlet chamber, wherein:
      a first end of the pneumatic inlet baffle is configured to couple to the inlet chamber, and a second end of the pneumatic inlet baffle is configured to couple to the evaporating tube body, and
      a first end of the pneumatic outlet baffle is configured to couple to the evaporating tube body, and a second end of the pneumatic outlet baffle is configured to couple to the outlet chamber:
   transferring the flue gas through the inlet chamber into the evaporating tube body;
   obtaining, from a wastewater nozzle disposed inside the evaporating tube body, a plurality of atomized liquid droplets;
   mixing, in the evaporating tube body, the plurality of atomized liquid droplets and the flue gas; and
   evaporating the plurality of atomized liquid droplets to form crystals suspended in the flue gas.

2. The method according to claim 1, wherein the obtaining the flue gas through the evaporating tube inlet into the inlet chamber comprises:
   obtaining the flue gas from a gas pipeline through the evaporating tube inlet into the inlet chamber, wherein the gas pipeline is connected on a first flue between a denitration device and an air preheater.

3. The method according to claim 1, further comprising:
   transferring the crystals through the evaporating tube outlet to a dust collector, wherein the evaporating tube outlet is coupled to a flue gas pipe and the flue gas pipe is connected on a second flue between an external air preheater and the dust collector;
   collecting, by the dust collector, particles including the crystals and dust; and
   discharging the particles with coal ashes.

4. The method according to claim 1, wherein the inlet chamber comprises a horizontal section and an expansion section.

5. The method according to claim 4, wherein a ratio between cross-sectional areas of the horizontal section and the evaporating tube body is between 1:1.3 and 1:3.

6. The method according to claim 1, wherein the crystals comprise fine particles and heavy metal elements in the plurality of atomized liquid droplets.

7. The method according to claim 1, wherein the evaporating tube body further comprises:
   a pretreated waste pipe, and
   an air compressor air supply pipe disposed between the wastewater nozzle and the pretreated waste pipe, wherein the air compressor air supply pipe is configured to be connected between the wastewater nozzle and the pretreated waste pipe.

8. The method according to claim 1, wherein:
   the wastewater nozzle is a two-fluid atomizing nozzle; and
   a particle size of the plurality of atomized liquid droplets is between 30 µm and 100 µm.

* * * * *